Patented Oct. 12 1926.

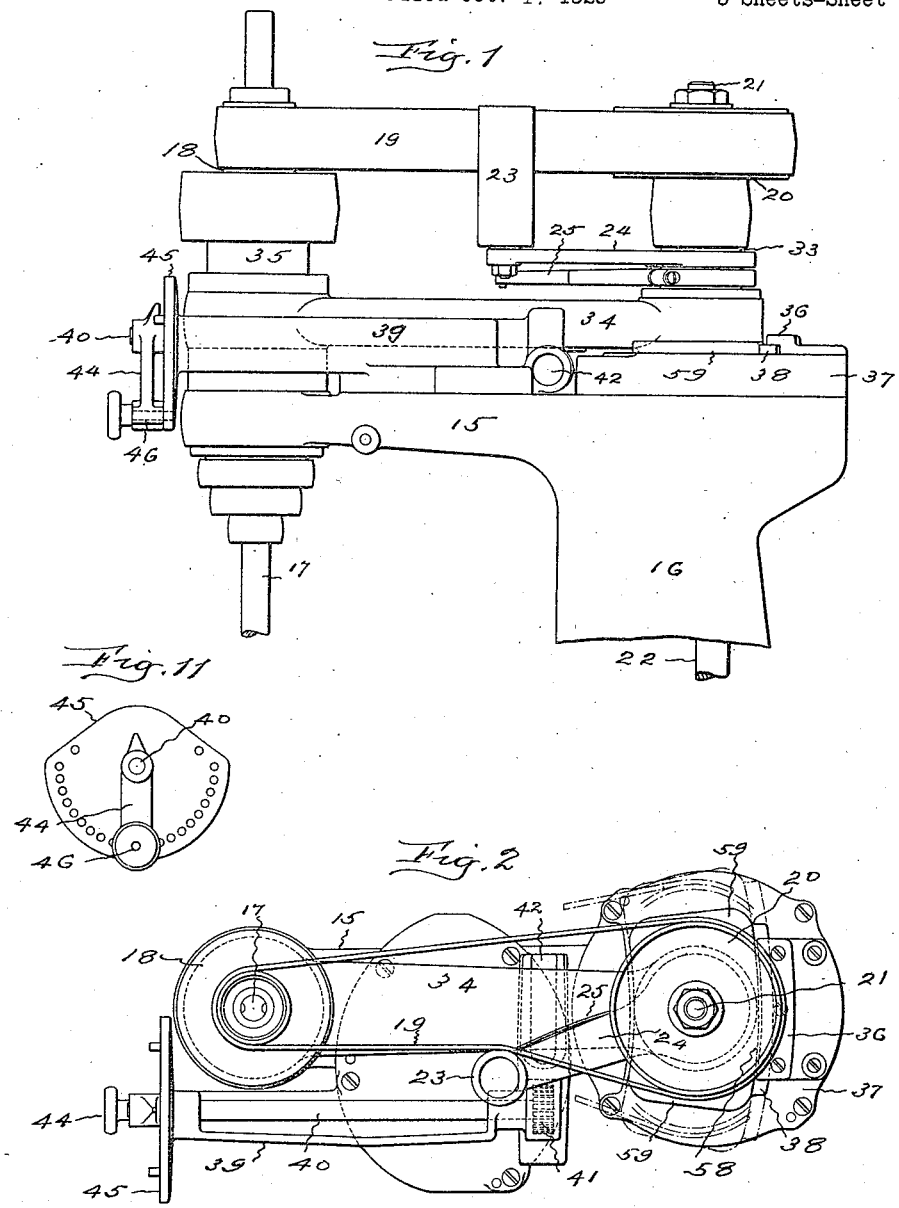

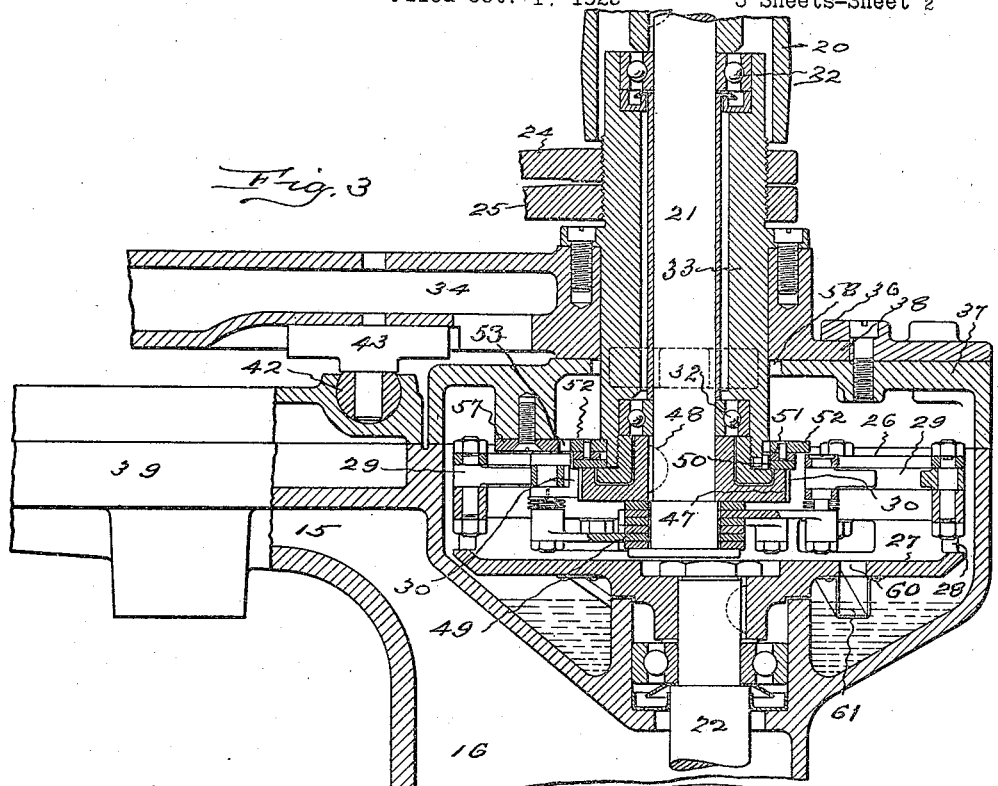
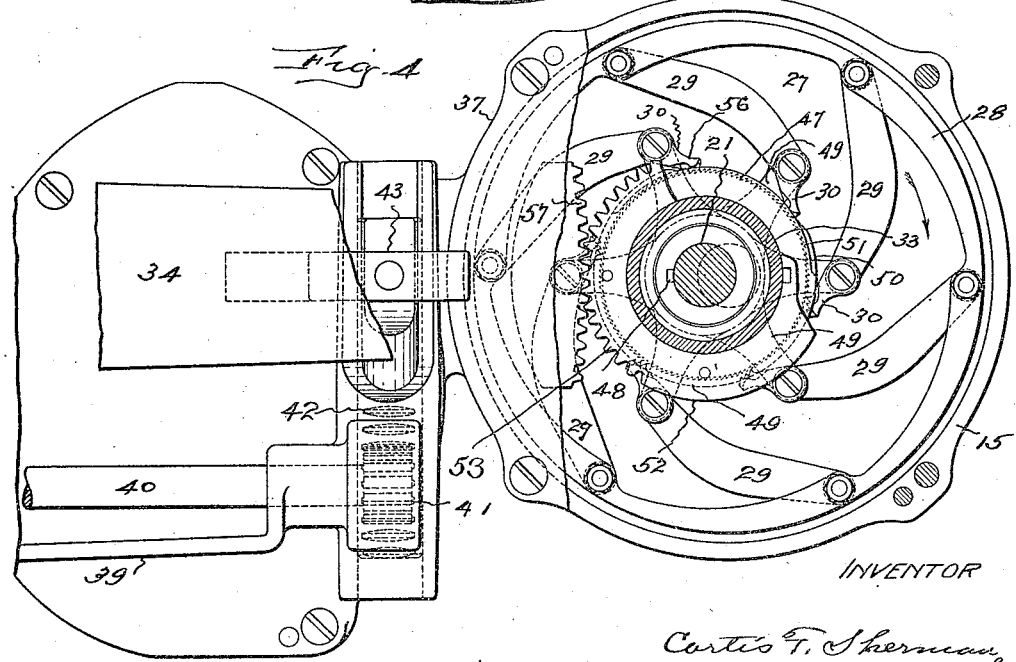

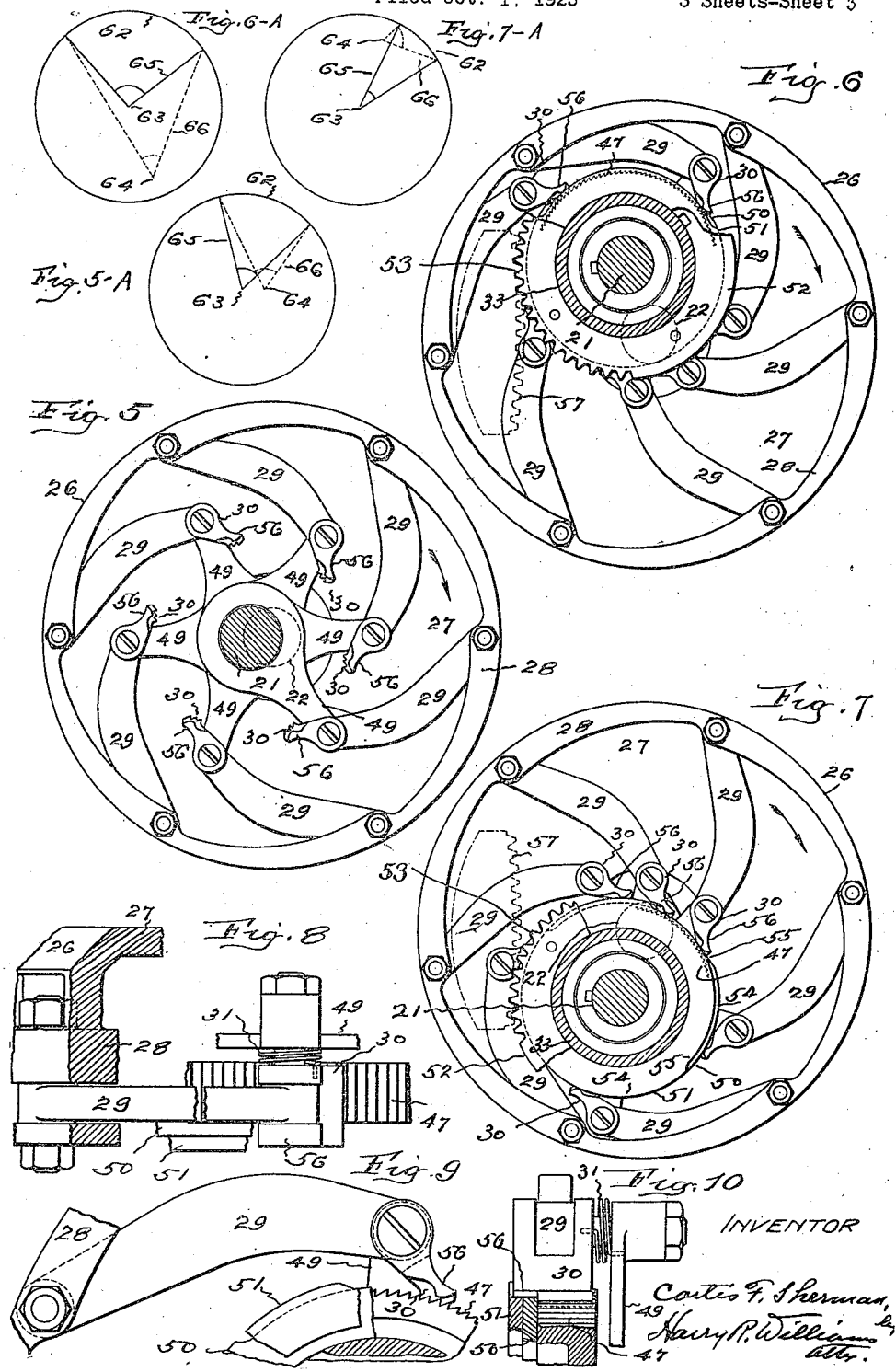

1,602,416

UNITED STATES PATENT OFFICE.

CORTIS F. SHERMAN, OF HARTFORD, CONNECTICUT, ASSIGNOR TO FREY VARIABLE SPEED GEAR CO., OF HOLYOKE, MASSACHUSETTS, A CORPORATION OF MASSACHUSETTS.

VARIABLE-SPEED TRANSMISSION.

Application filed October 1, 1925. Serial No. 59,778.

This invention relates to improvements in variable speed transmission wherein the driving and driven members are connected by positive as distinguished from frictional means, and either member driven at the same or faster or slower speeds than the other without interrupting their movements or the delivery of power, the variations being infinite within the limits of adjustment of the mechanism.

Variable speed mechanisms of the class in which driving and driven members are arranged face to face, one being movable transversely with relation to the other to vary the relations of their axes, and with a series of interposed driving connectors which transmit angular movements of rotation of the driving member to the driven member according to the adjustment of the axes of the members, have been provided.

The object of this invention is to simplify, improve and render more efficient variable speed mechanisms of this character. This object is attained by eliminating parts and rearranging the elements of the prior mechanisms in such a manner that the cost of manufacture is reduced, the durability and life of the mechanisms is increased, the range of action is extended and the control is rendered more satisfactory.

The connectors are in the forms of pawls carried by a rotatable driving member, which pawls are at intervals engaged with a ratchet wheel connected with a rotatable driven member, and the time of engagement and distance of travel of the pawls in engagement with the ratchet wheel, is controlled by an angularly adjustable cam, whereby the relative speeds of rotation of the driving member and driven member may be varied. In accomplishing the object of this improvement the cam which controls the angular operative positions of the pawls is arranged to act directly against parts of the pawls, which saves pieces; the pawls are arranged on links in the plane of the driven ratchet wheel so that there is no overhang, which ensures better action and longer life; the pawl carrying links are so mounted as to permit the pawls to be brought closer together than with such a solid head as is used in the prior mechanisms, and this enables a slower speed to be obtained with fewer teeth of the ratchet wheel engaged by the pawls; the constant speed driving head is provided with cups designed to distribute lubricating oil to the movable elements to ensure their easy action; the means for adjusting and locking the controlling cam are so arranged that holes in an index plate will represent the number of pawls engaged and the minimum and maximum number of ratchet teeth engaged, and by changing the adjusting pin from hole to hole the desired speed may be obtained.

This mechanism is applicable to many machines, but as it is particularly useful for driving the drill spindle of a drilling, tapping or reaming machine, it is therefore described herein as designed for such a machine.

Fig. 1 shows a side elevation of the upper head of a drilling machine provided with a variable speed mechanism which embodies this invention. Fig. 2 shows a plan of the same. Fig. 3 is a vertical section, on larger scale, of the variable speed mechanism and supporting parts. Fig. 4 is a plan of the same with parts broken away. Fig. 5 is a plan of the driving head and pawls carried thereby. Fig. 6 is a similar view showing pawls engaged with the ratchet wheel, the control cam, and means for adjusting the cam, the parts being in one adjustment. Fig. 7 is a view of the same with the parts in another adjustment. Fig. 8 is a detail showing a pawl engaging the ratchet wheel, and a part of the control cam. Fig. 9 is a side view of the same. Fig. 10 is an end view of what is seen in Fig. 9. Fig. 11 is a face view of the index plate and crank handle for adjusting the control cam. Figs. 5A, 6A and 7A are diagrams of the action of the elements.

In the views 15 indicates the head of the column 16 of a common type of drilling machine which has a drill spindle 17 with a pulley 18 connected by a belt 19 with a pulley 20 on the driven shaft 21 that is connected with the driving shaft 22 by a speed changing mechanism which embodies this invention. The belt is kept taut by a belt tightening roll 23 on a swinging arm 24 in the usual way, Figs. 1 and 2. A spring 25 is arranged to cause the roll to bear with the desired tension against one length of the belt.

The driving shaft 22 is driven by any suitable mechanism at a constant speed, which speed of course may be varied by the usually employed means. The driving shaft is shown as extending upwardly into the head of the column, and fastened to the upper end of the driving shaft so as to rotate therewith is a driving member 26 which is in the form of a cup having a circular bottom 27 and an annular upwardly extending rim 28. Pivoted at intervals to the rim of the driving member and extending inwardly are links 29 and pivoted on the swinging ends of the links are pawls 30, Fig. 5. Springs 31, Fig. 8, arranged on the stems of the pawls tend to turn the toothed ends of the pawls toward the axis of rotation.

The driven shaft 21 is supported by anti-friction bearings 32 in the ends of a vertically arranged sleeve 33, Fig. 3. This sleeve is carried by and fastened to the swinging end of an oscillatory arm 34, the other end of which is pivotally supported on a sleeve 35 which surrounds the drill spindle, Figs. 1, 2. The driven shaft is so positioned that its axis is eccentric to the axis of the driving shaft and the amount of this eccentricity may be varied by swinging the arm more or less to one side or the other of the axis of the driving shaft, or the axes may be positioned in line with the axis of the swinging arm. By means of the connections to be hereinafter described, when the axis of the driving shaft, the axis of the driven shaft, and the axis of the arm are in the same plane the two shafts will rotate at the same speed, when the axis of the driven shaft is at one side of the axis of the driving shaft the driven shaft will be rotated faster than the driving shaft, and when the axis of the driven shaft is on the other side of the axis of the driving shaft the driven shaft will be rotated slower than the driving shaft. These variations depend upon the amount of eccentricity of the axes of the two shafts, that is, the distance that the axis of the driven shaft is to one side or the other of the axis of the driving shaft.

The swinging end of the arm is retained and guided in its movements by a gib 36 attached to the cover 37 that is fastened to the column-head over the connector mechanism, which gib extends onto a flange 38 on the end of the arm, Figs. 1, 2. Attached to the top of the column is a frame 39 that supports a horizontal shaft 40. The inner end of this shaft has a pinion 41 that engages with a rack 42 adapted to slide transversely of the head below the arm. The rack carries a key 43 that extends into a slot in the under side of the arm near the swinging end, Figs. 3, 4. The outer end of the shaft has a crank handle 44. By turning this handle, through the shaft, pinion, rack and key, the swinging end of the arm carrying the driven shaft may be oscillated to any position, within the limits of the mechanism, with relation to the driving shaft. Fastened to the outer end of the frame is a perforated index plate 45 and the handle has a pin 46 adapted to project into the perforations of this plate for the purpose of retaining the parts in the positions to which they are adjusted.

A ratchet wheel 47 is fastened to the driven shaft near its lower end by a key 48, Figs. 3, 4. Mounted on the lower end of the driven shaft below the ratchet wheel so as to be independently rotatable are arms 49. The outer ends of these arms, which are equal in number to the links 29 that carry the pawls 30, are pivotally connected with the swinging ends of the links, Figs. 3, 5. As these arms are mounted on the driven shaft they retain the pawls a definite distance from the axis of the driven shaft but as the driven shaft is adjustably eccentrically with relation to the driving shaft the distance of the pawls from the axis of the driving shaft varies with the amount of this eccentricity.

The control cam comprises two disks 50 and 51 mounted on the lower end of the swinging supporting sleeve 33. The former disk is keyed to the end of the sleeve while the latter disk is adjustable with relation thereto, the latter being fastened to the face of a disk 52 that is rotarily adjustable on the lower end of the sleeve and has gear teeth 53 in a section on its periphery, Figs. 3, 4. The peripheries of these disks are formed with similar high segments 54 and low segments 55, Fig. 7, one being adjustable with relation to the other in order that the length of the low segments may be varied. The peripheries of these disks lie in the plane of ears 56 on the sides of the pawls, and the lower segments are of such a depth that they permit the pawls to engage with the teeth of the ratchet wheel, while the high segments are sufficiently high to lift the pawls from engagement with the ratchet wheel, Figs. 8, 9, 10. Thus by adjusting one cam disk with relation to the other the interval of time of engagement of the pawls with the ratchet wheel may be varied. This adjustment is accomplished automatically by means of a toothed segment 57 attached to the under side of the stationary cover 37, Figs. 3, 4. The teeth of this segment mesh with the teeth on the periphery of the disk 52 so that as the arm is swung and the driven shaft is carried more or less eccentric with relation to the driving shaft, the teeth on the disk 52 engaging with the teeth of the fixed segment cause the adjustable cam disk to be turned correspondingly and thus the length of the low section of the control cam is varied according to the eccentric adjustment of the driven shaft.

The recess in the top of the column in which the shaft connecting mechanism is located is in the shape of a receptacle adapted to contain lubricant, Fig. 3. The top of the recess is closed by the cover 37 which has a slot 58 to permit the movements of the sleeve as it is carried by the swinging arm when the axial relations of the shafts are changed. Flanges 59 project from the bottom of the swinging end of the arm in order to keep the slot closed at all times, Figs. 1, 2. Openings 60 are made in the bottom of the driving member 26 and buckets 61 are arranged beneath these openings for the purpose of scooping up and throwing lubricant from the receptacle onto the connecting mechanism, as the driving member is rotated.

In operation the driving shaft is run at a constant speed and the driven shaft may be run at the same speed, or faster, or slower, depending upon its adjustment with relation to the driving shaft. This adjustment is obtained by turning the crank handle at the front of the machine and through the pinion, rack and key swinging the arm that is pivotally mounted on the sleeve that surrounds the drill spindle and that carries the vertical sleeve containing the driven shaft. As the pawls are carried by and revolved with a member that is concentric with the driving shaft, but are controlled by means that are concentric with the driven shaft, altering the relation of the driven shaft to the driving shaft causes a change in the relations of the angular movements of the pawls to the ratchet wheel. When the axis of the driven shaft is in a line between the axis of the driving shaft and the axis of the swinging arm, the angular movements of the pawls and angular movement of the ratchet wheel are the same during any given interval of time. With the axis of the driven shaft at one side of such line the angular movement of the ratchet wheel is greater than the angular movements of the pawls, while with the axis of the driven shaft at the other side of the line the angular movement of the ratchet wheels is less than the angular movements of the pawls. This is indicated by the diagrams Figs. 5A, 6A, 7A which respectively represent the relations of the axes of the driving and driven shafts as shown in Figs. 5, 6, and 7. In these diagrams the circles represent the pitch line of the ratchet teeth, and the segments 62 the interval of time that the pawls are engaged with the ratchet teeth, 63 indicates the center of the driven shaft and 64 the center of the driving shaft in the different positions illustrated. The full lines 65 show the angular movement of the ratchet wheel during the specified interval of time, and the dotted line 66 shows the angular movements of the pawls in engagement with the ratchet teeth during the same interval of time. From these it will be seen where the centers are opposite (Fig. 5A) the angular movements of the driving and driven shafts are equal for a like interval of time, consequently the speed of the shafts is the same. With the center of the driven shaft below the center of the driving shaft, (Fig. 6A) the angular movements of the pawls in engagement with the ratchet teeth is less than the angular movement of the ratchet wheel, therefore the driven shaft will be rotated faster that the driving shaft. When the center of the driven shaft is above the center of the driving shaft, (Fig. 7A) the angular movement of the ratchet wheel is less than the angular movement of the pawls in the same interval of time, therefore the driven shaft will be rotated slower than the driving shaft. Thus by changing the driven shaft with relation to the driving shaft any desired variation of speed may be given to the driven shaft from the constantly rotating driving shaft. These variations may be made while the machine is running and the graduations are infinite from slower to faster or vice versa. There is always more than one pawl in engagement with the ratchet teeth so that the action is uniform and power uninterrupted, and as the parts are thoroughly lubricated the movements are easy and noiseless.

The control cam which ensures the exact interval of engagement of the pawls with the ratchet wheel is automatically adjusted by the swinging of the arm, and it is arranged substantially in the plane of the pawls so that the pawls engage directly therewith. The pawls are mounted on links which are in the plane of the ratchet wheel so that there is no overhang, which ensures a more exact performance of their function and longer life. The pawl carrying links are mounted in the cup-shaped driving member in such manner that the links may be swung outward a maximum distance or swung inward so that the pawls are close together, thus allowing more than one pawl to engage the ratchet teeth even when the lowest speed is to be obtained. The parts are thoroughly lubricated, and the adjusting means is convenient to operate and will retain the connectors in the necessary positions to obtain the desired speed of the driven shaft with respect to the driving shaft. In the machine illustrated the ratchet teeth are so shaped and the pawls so hung that the pawls when in driving engagement push against the ratchet teeth

The invention claimed is:—

1. A variable speed transmission comprising a driving shaft, a driven shaft, means for varying the axial relations of said shafts, a ratchet wheel attached to the driven shaft, pawls rotatable with the driving shaft and adapted to engage the ratchet wheel, means connecting the pawls with the driven shaft whereby the relations of the teeth of the pawls and the ratchet teeth will be altered with the changes of relations of the axes of the shafts, an adjustable control cam movable with the driven shaft and adapted to engage directly with the pawls, and means for adjusting the cam and varying the periods of engagement and disengagement of the pawl teeth with the ratchet teeth.

2. A variable speed transmission comprising a driving shaft, a driven shaft, means for varying the axial relations of said shafts, a ratchet wheel attached to the driven shaft pawls rotatable with the driving shaft and adapted to engage the ratchet wheel, means connecting the pawls with the driven shaft whereby the relations of the teeth of the pawls and the ratchet teeth will be altered with the changes of relations of the axes of the shafts, an adjustable control cam movable with the driven shaft and adapted to engage directly with the pawls, and means which automatically varies the periods of engagement and disengagement of the pawl teeth with the ratchet teeth, actuated by the movements of the driven shaft.

3. A variable speed transmission comprising a driving shaft, a driven shaft, means for varying the axial relations of said shafts, a ratchet wheel attached to the driven shaft, pawls rotatable with the driving shaft and adapted to engage the ratchet wheel, means connecting the pawls with the driven shaft whereby the relations of the teeth of the pawls and the ratchet teeth will be altered with the changes of relations of the axes of the shafts, an adjustable control cam movable with the driven shaft and adapted to engage directly with the pawls, and a stationary toothed segment and intermeshing toothed segment for adjusting said cam and varying the periods of engagement and disengagement of the pawl teeth with the ratchet teeth, according to the movement of the driven shaft.

4. A variable speed transmission comprising a driving shaft, a cylindrical driving member attached to the driving shaft, a driven shaft, means for varying the axial relations of said shafts, a ratchet wheel attached to the driven shaft, links pivoted to the wall of said driving member in the plane of the ratchet wheel, pawls carried by said links and adapted to engage the ratchet wheel, and arms connecting the pawls with the driven shaft whereby the relations of the teeth of the pawls and the ratchet teeth will be altered with the changes of relations of the axes of the shafts.

5. A variable speed transmission comprising a driving shaft, a cylindrical driving member attached to the driving shaft, a driven shaft, means for varying the axial relations of said shafts, a ratchet wheel attached to the driven shaft, links pivoted to the wall of said driving member in the plane of the ratchet wheel, pawls carried by said links and adapted to engage the ratchet wheel, arms connecting the pawls with the driven shaft whereby the relations of the teeth of the pawls and the ratchet teeth will be altered with the changes of relations of the axes of the shafts, and a normally stationary cam adjustable with the driven shaft and adapted to engage directly with the pawls for controlling the periods of engagement and disengagement of the pawl teeth with the ratchet teeth.

6. A variable speed transmission comprising a driving shaft, a driving member attached to the driving shaft, a driven shaft, means for varying the axial relations of said shafts, a ratchet wheel attached to the driven shaft, pawls rotatable with said driving member and adapted to engage the ratchet wheel, arms connecting the pawls with the driven shaft whereby the relations of the teeth of the pawls and the ratchet teeth will be altered with the changes of relations of the axes of the shafts, a normally stationary cam adjustable with the driven shaft and adapted to engage directly with the pawls for controlling the periods of engagement and disengagement of the pawl teeth with the ratchet teeth, and means on said driving member adapted to, as said member is rotated, distribute lubricant upon the pawls and ratchet wheel.

7. A variable speed transmission comprising a driving shaft, a hollow cylindrical driving member attached to the driving shaft, a driven shaft, means for varying the axial relations of said shafts, a ratchet wheel attached to the driven shaft, links pivoted to the cylindrical wall of said driving member and adapted to swing within the cylinder in the plane of the ratchet wheel, pawls carried by said links and adapted to engage the ratchet wheel, and arms connecting the pawls with the driven shaft whereby the relations of the teeth of the pawls and the ratchet teeth will be altered with the changes of relations of the axes of the shafts.

8. A variable speed transmission comprising a driving shaft, a driven shaft, means for varying the axial relations of said shafts, a ratchet wheel attached to the driven shaft, pawls rotatable with the driving shaft and adapted to, when rotated, at intervals, push against the teeth of the ratchet wheel, means connecting the pawls with the driven shaft, whereby the relations of the teeth of the pawls and the ratchet teeth will be altered with the changes of relations of the axes of the shafts, and a normally stationary cam adjustable with the driven shaft and adapted to engage directly with the pawls for controlling the periods of engagement and disengagement of the pawl teeth with the ratchet teeth.

9. A variable speed transmission comprising a driving shaft, a cylindrical driving member attached to the driving shaft, a driven shaft, means for varying the axial relations of said shafts, a ratchet wheel attached to the driven shaft, links pivoted to the wall of said driving member in the plane of the ratchet wheel, pawls provided with ears, carried by said links and adapted to engage the ratchet wheel, arms connecting the pawls with the driven shaft whereby the relations of the teeth of the pawls and the ratchet teeth will be altered with the changes of relations of the axes of the shafts, and a normally stationary cam adjustable with the driven shaft and adapted to engage said ears on the pawls for controlling the periods of engagement and disengagement of the pawl teeth with the ratchet teeth.

10. A variable speed transmission comprising a driving shaft, a driven shaft, a swinging arm supporting the driven shaft, a shaft, pinion and rack for swinging said arm, a crank handle for rotating the last mentioned shaft and thereby swinging the arm and varying the axial relations of said driving and driven shafts, a ratchet wheel attached to the driven shaft, pawls rotatable with the driving shaft and adapted to engage the ratchet wheel, means connecting the pawls with the driven shaft whereby the relations of the teeth of the pawls and the ratchet teeth will be altered with the changes of relations of the axes of the shafts, and a normally stationary cam adjustable with the driven shaft and adapted to engage directly with the pawls for controlling the periods of engagement and disengagement of the pawl teeth with the ratchet teeth.

11. A variable speed transmission comprising a driving shaft, a driven shaft, means for varying the axial relations of said shafts, a toothed member attached to and rotatable with the driven shaft, toothed members connected to and rotatable with the driving shaft, said toothed members being adapted to engage at intervals, means connecting said latter toothed members with the driven shaft whereby the relations of their teeth with the teeth of the former toothed member will be altered with the changes of relations of the axes of the shafts, and a normally stationary cam movable with the driven shaft and adapted to control the periods of engagement and disengagement of the toothed members.

CORTIS F. SHERMAN.